US006705455B2

(12) United States Patent
Lin

(10) Patent No.: US 6,705,455 B2
(45) Date of Patent: Mar. 16, 2004

(54) FEEDING ROLLER ADAPTED FOR FEEDING A WORKPIECE ON A WORKTABLE

(76) Inventor: Ching-Chi Lin, No. 473, San Feng Rd., Houli Hsiang, Taichung Hsien (TW)

(*) Notice: Subject to any disclaimer, the term of this patent is extended or adjusted under 35 U.S.C. 154(b) by 36 days.

(21) Appl. No.: 10/234,468

(22) Filed: Sep. 5, 2002

(65) Prior Publication Data

US 2003/0192773 A1 Oct. 16, 2003

(51) Int. Cl.[7] ................................ B65G 35/00
(52) U.S. Cl. .................. 198/722; 144/246.1; 144/247; 492/16
(58) Field of Search .................. 198/722; 144/245.1, 144/246.1, 247, 248.3, 248.7, 66, 208.5, 36, 242.1, 246.2; 492/16

(56) References Cited

U.S. PATENT DOCUMENTS 12,080 A * 12/1854 Ensign .................... 126/99 R
358,550 A * 3/1887 Harvey .................... 83/425.3
1,514,505 A * 11/1924 Conklin .................. 144/246.1
2,604,128 A * 7/1952 Dick et al. .............. 144/248.3
4,901,778 A * 2/1990 Fenton .................... 144/230
5,152,328 A * 10/1992 Arvidsson ................ 144/248.3
5,797,438 A * 8/1998 Dye ...................... 144/246.1
6,481,471 B1 * 11/2002 Johnson et al. .......... 144/246.1

* cited by examiner

*Primary Examiner*—Richard Ridley
(74) *Attorney, Agent, or Firm*—Hunton & Williams LLP

(57) ABSTRACT

A feeding roller includes a hub member mounted to rotate with a driven shaft, a plurality of angularly displaced anchored seat members disposed on a surrounding outer wall of the hub member and defining anchored areas, a surrounding workpiece contacting member surrounding and spaced apart from the hub member so as to be brought into frictional contact with a workpiece, a plurality of force transmitting members disposed on an inner annular wall surface of the surrounding workpiece contacting member and forming secured areas which spacedly confront and lead the anchored areas, respectively, and a plurality of coupling and biasing members, each interposed between the secured area and the corresponding anchored area. Rotation of the hub member is transmitted to the surrounding workpiece contacting member to bring the surrounding workpiece contacting member into contact with the workpiece so as to feed the workpiece with an even and smooth compression force.

3 Claims, 6 Drawing Sheets

FEEDING ROLLER ADAPTED FOR FEEDING A WORKPIECE ON A WORKTABLE

CROSS-REFERENCE TO RELATED APPLICATION

This application claims priority of Taiwanese Application No. 091204749, filed on Apr. 11, 2002.

BACKGROUND OF THE INVENTION

1. Field of the Invention

This invention relates to a feeding roller, more particularly to a feeding roller for feeding a workpiece along a feeding route on a worktable of a wood working machine.

2. Description of the Related Art

A conventional feeding machine for feeding a workpiece along a feeding route on a worktable of a wood working machine generally includes a housing which is disposed above the worktable, and a plurality of feeding rollers which are mounted rotatably on a driven shaft that is driven by a motor. Each feeding roller includes a metal rim which is fixed on and which is rotated with the driven shaft, and a rubber sleeve which is sleeved on the metal rim so as to be in frictional contact with the workpiece placed on the worktable. When a workpiece of an irregular thickness is fed, the pressing force of the feeding roller applied to the workpiece is uneven, thereby resulting in deformation and bending of the workpiece. In addition, the rubber sleeve is susceptible to wearing and deformation, thereby resulting in shortened service life of the feeding roller and adversely affecting the feeding operation.

SUMMARY OF THE INVENTION

The object of the present invention is to provide a feeding roller which can feed a workpiece with an irregular thickness smoothly and evenly and which has a prolonged service life.

According to this invention, the feeding roller includes a hub member adapted to be rotated with a driven shaft and having a surrounding outer wall. A plurality of anchored seat members are disposed on the surrounding outer wall and are angularly displaced from one another. Each anchored seat member extends from the surrounding outer wall outwardly, and terminates at a distal outer end so as to define an anchored area between the surrounding outer wall and the distal outer end. A surrounding workpiece contacting member is disposed to surround and is spaced apart from the hub member, and includes an outer annular wall surface having a plurality of tangential points which are angularly displaced from one another. Each tangential point is adapted to be sequentially brought into frictional contact with the workpiece. When a respective one of the tangential points is brought into frictional contact with the workpiece, a reaction force is generated by the workpiece at the respective one of the tangential points and is directed toward the axis of the driven shaft. A plurality of force transmitting members extend from the outer annular wall surface inwardly and radially, and are angularly displaced from one another to bear the reaction force. Each force transmitting member includes a secured area which spacedly confronts and is ahead of a respective one of the anchored areas in one of clockwise and counterclockwise directions. When the outer annular wall surface is forced by the reaction force inwardly at the respective one of the tangential points, the secured area is moved towards the respective one of the anchored areas. A coupling and biasing member is interposed between the secured area and the corresponding anchored area such that rotation of the hub member is transmitted to the surrounding workpiece contacting member, thereby bringing the tangential points sequentially into contact with the workpiece, and such that the secured area is biased to move away from the corresponding anchored area.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
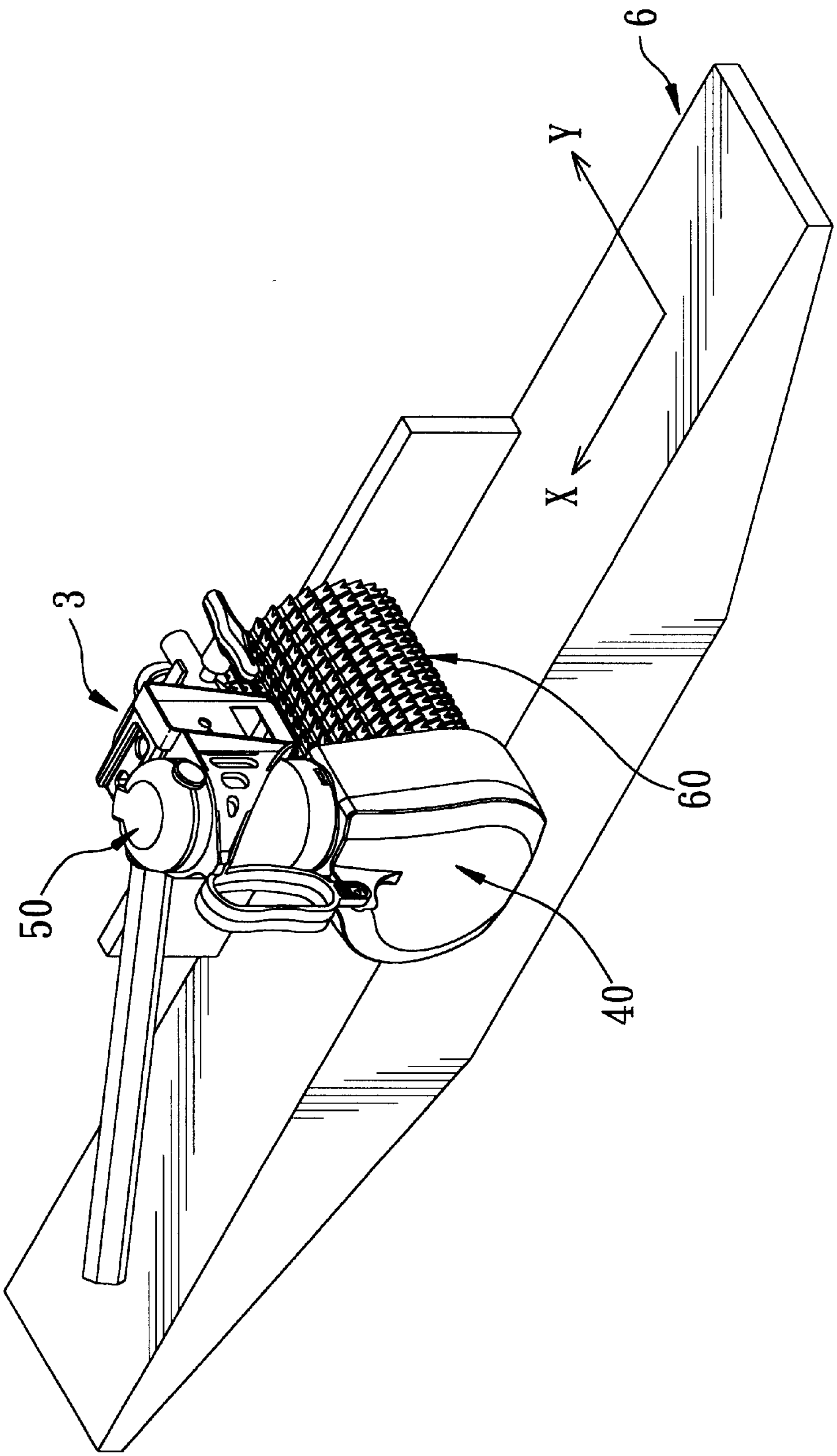
FIG. 1 is a perspective view of a preferred embodiment of a feeding roller according to this invention when incorporated in a feeding device.
Figure 2:
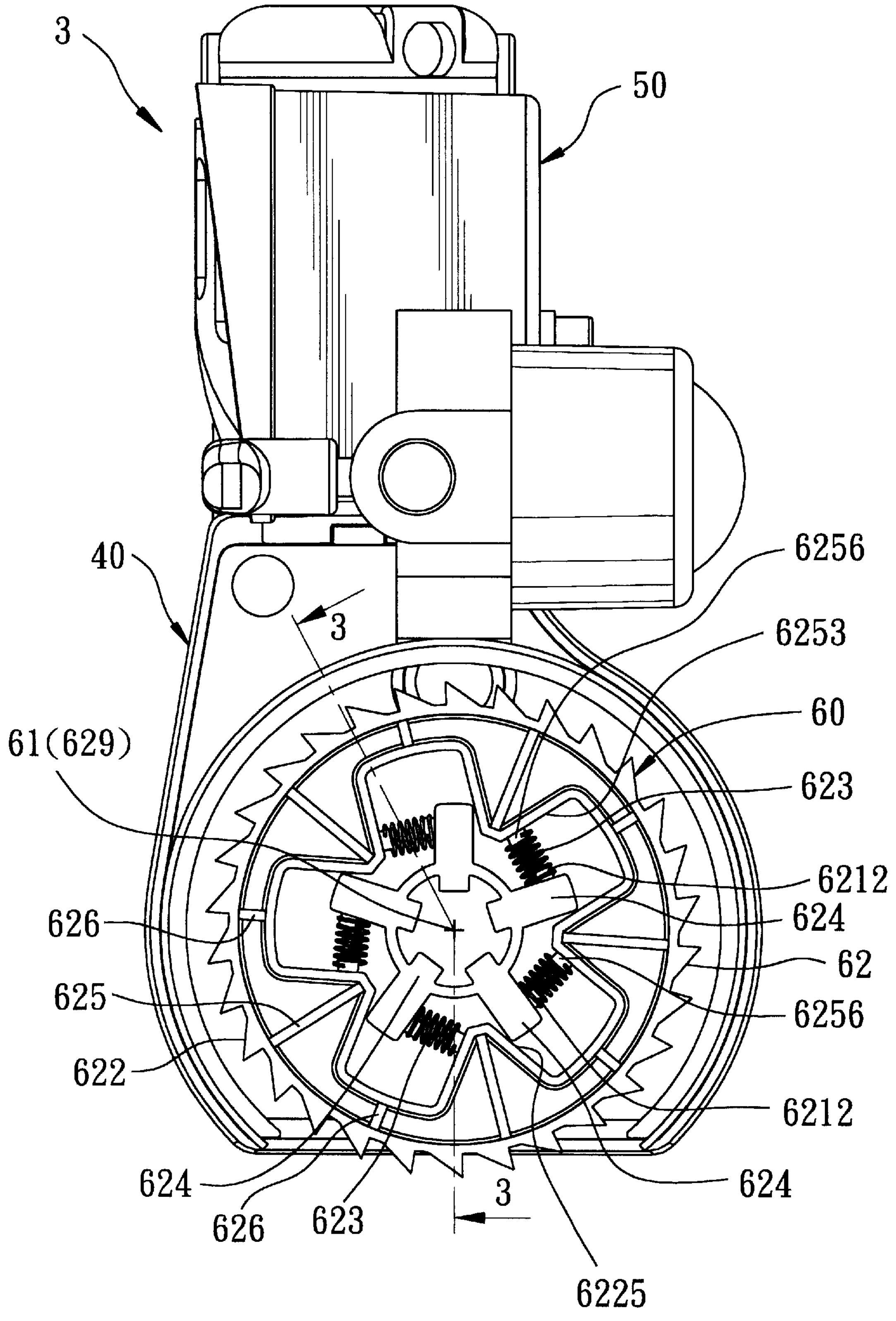
FIG. 2 is a side-view of the feeding device shown in FIG. 1.
Figure 3:
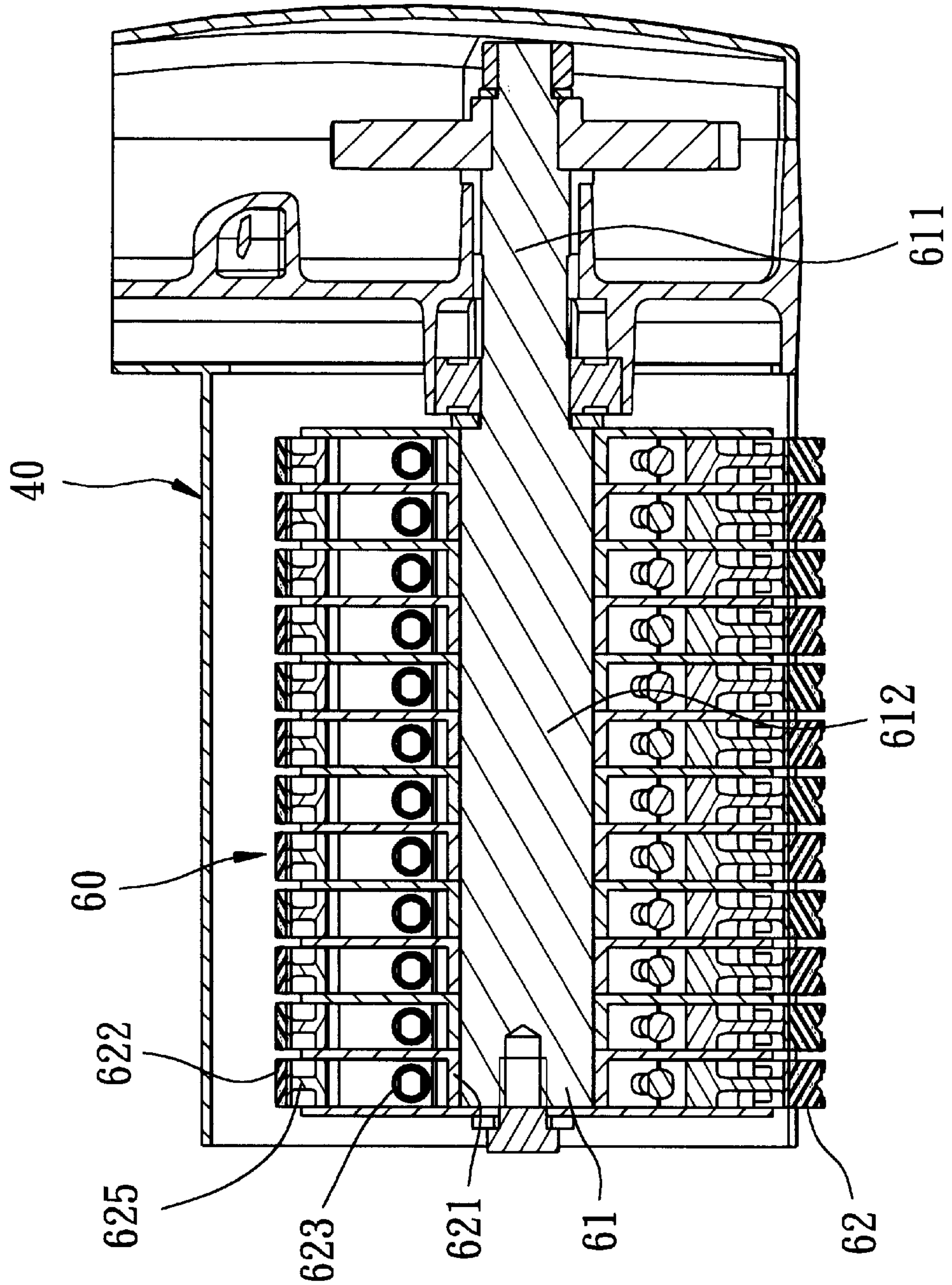
FIG. 3 is a sectional view of the feeding device shown in FIG. 2, taken along lines 3–3 thereof.

Referring to FIGS. 1, 2 and 3, the preferred embodiment of a feeding roller 62 according to the present invention is shown to be mounted at an open side of a feeding device 3. The feeding device 3 is mounted above a worktable of a wood working machine 6 on which a workpiece (not shown) is placed, and includes a housing 40, a drive motor 50, and a feeding roller assembly 60. The feeding roller assembly 60 includes a driven shaft 61 which has an input segment 611 that is driven by the drive motor 50 to rotate about an axis, and an output segment 612 of spline-shape, and a plurality of the feeding rollers 62 which are arranged in a row in a direction (Y) and which are mounted on the output segment 612 so as to be adapted for feeding the workpiece along a feeding route (X) transverse to the direction (Y).

Figure 4:
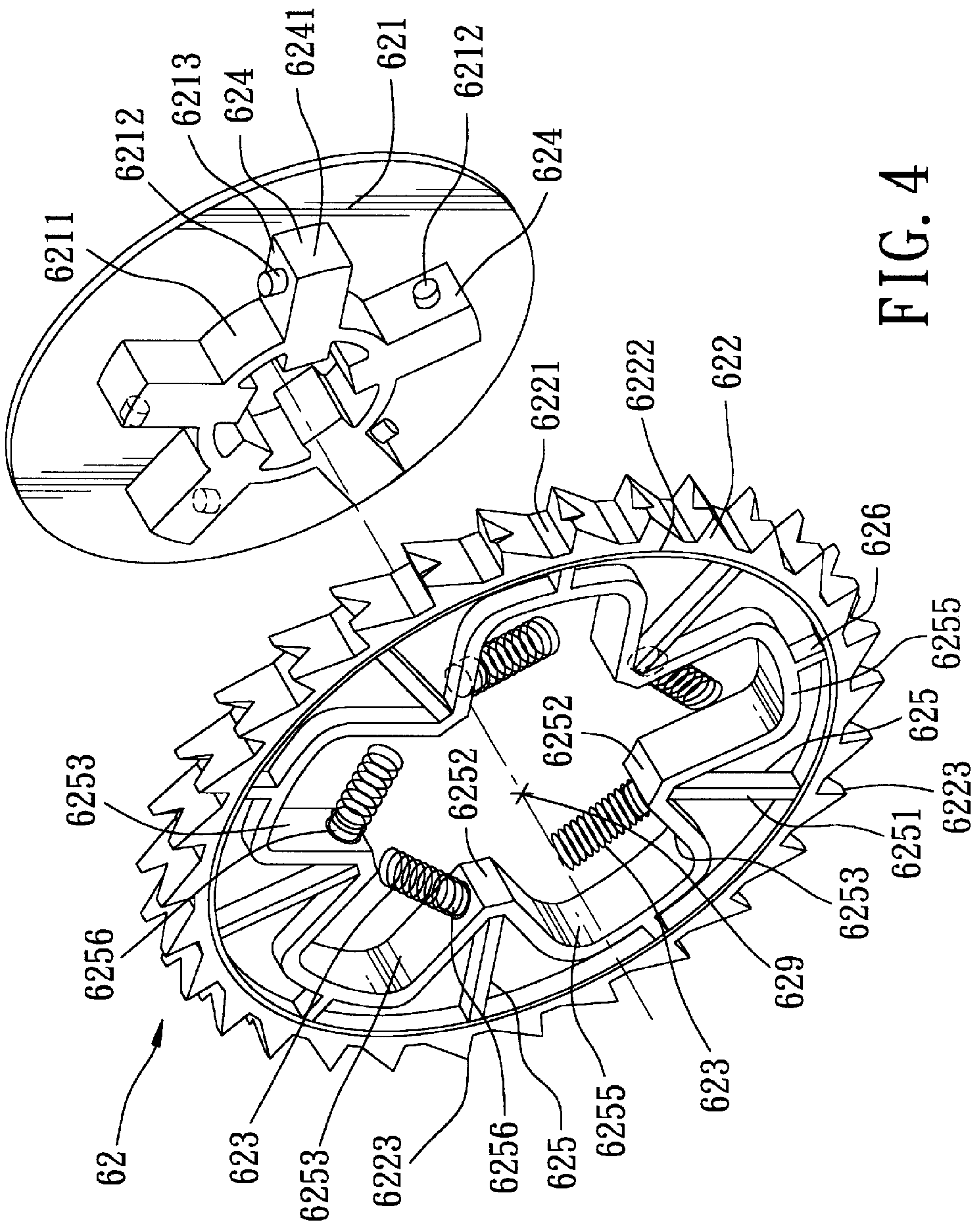
FIG. 4 is an exploded perspective view of the feeding roller of the preferred embodiment.

With reference to FIG. 4, the feeding roller 62 is shown to comprise a hub member 621, a plurality of anchored seat members 624, a surrounding workpiece contacting member 622, a plurality of force transmitting members 625, and a plurality of coupling and biasing members 623.

The hub member 621 is splined to and is rotated with the output segment 612 of the driven shaft 61, and has a surrounding outer wall 6211.

The anchored seat members 624 are disposed on the surrounding outer wall 6211, and are angularly displaced from one another. Each anchored seat member 624 extends from the surrounding outer wall 6211 outwardly, and terminates at a distal outer end 6241 so as to define an anchored area 6213 between the surrounding outer wall 6211 and the distal outer end 6241. A coupling protrusion 6212 is disposed on a respective one of the anchored areas 6213 of the anchored seat members 624.

The surrounding workpiece contacting member 622 is disposed to surround and is spaced apart from the surrounding outer wall 6211 of the hub member 621, and includes outer and inner annular wall surfaces 6221,6222 opposite to each other in radial directions. The outer annular wall surface 6221 includes a plurality of tangential points 6223 which are angularly displaced from one another. Each of the tangential points 6223 is adapted to be sequentially brought into frictional contact with a workpiece placed on the worktable. As such, when a respective one of the tangential points 6223 is brought into frictional contact with the workpiece, a reaction force is generated by the workpiece at the respective one of the tangential points 6223 and is directed toward the axis of the driven shaft 61 such that the outer annular wall surface 6221 is deformable inwardly and radially.

The force transmitting members 625 are disposed on the inner annular wall surface 6222 of the surrounding workpiece contacting member 622, and are angularly displaced from one another such that each of the force transmitting members 625 bears the reaction force emanating from the respective one of the tangential points 6223.

Each force transmitting member 625 includes a force transmitting segment 6251, a force diverting segment 6253, and an interconnecting segment 6255. The force transmitting segment 6251 extends inwardly and radially from the inner annular wall surface 6222, and terminates at a distal inner end 6252. The force diverting segment 6253 extends from the distal inner end 6252 outwardly, and forms with the force transmitting segment 6251 an included acute angle which faces towards the surrounding workpiece contacting member 622 so as to serve as a secured area 6253. The interconnecting segment 6255 is disposed to connect the force diverting segment 6253 to the distal inner end 6252 of a next one of the force transmitting members 625, and is spacedly interposed between the distal outer end 6241 of a respective one of the anchored seat members 624 and the inner annular wall surface 6222. In addition, a coupling protrusion 6256 is disposed on a respective one of the secured areas 6253.

Figure 5:
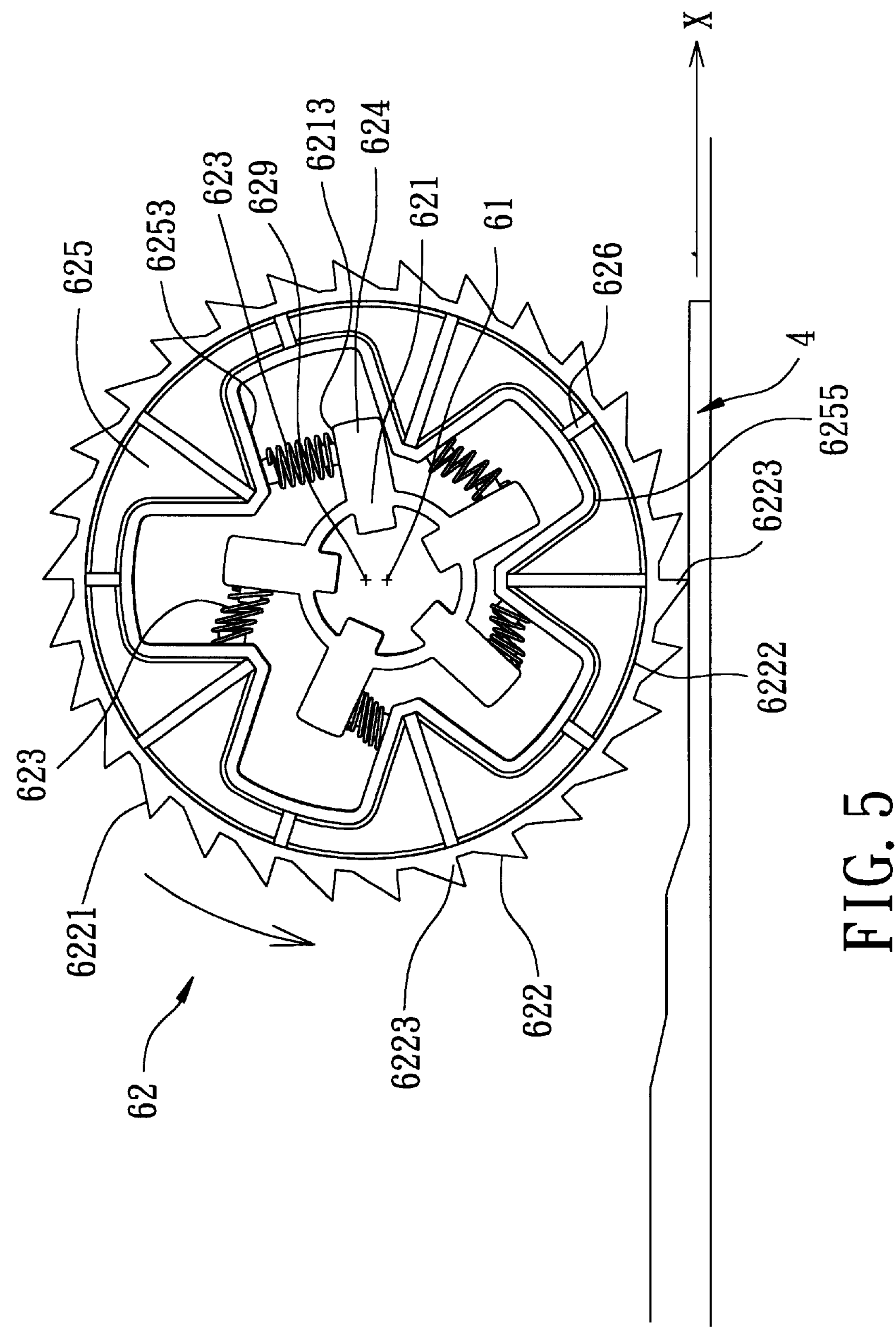
FIG. 5 is a schematic view showing the preferred embodiment when feeding a workpiece.

Referring to FIG. 5, the secured area 6253 spacedly confronts and is ahead of a respective one of the anchored areas 6213 in one of clockwise and counterclockwise directions (the counterclockwise direction in FIG. 5). When the outer annular wall surface 6221 of the surrounding workpiece contacting member 622 is deformed by the reaction force inwardly at the respective one of the tangential points 6223, the secured area 6253 is moved towards the respective one of the anchored areas 6213. As shown in FIG. 2, before feeding operation of the feeding roller 62, a center 629 of the surrounding workpiece contacting member 622 is located at the axis of the driven shaft 61.

A bracing member 626 is disposed to brace between the interconnecting segment 6255 and the inner annular wall surface 6222 of the surrounding workpiece contacting member 622 at a position between two adjacent ones of the tangential points 6223.

Each coupling and biasing member 623 is a compression spring, and has two ends secured respectively on the coupling protrusions 6256,6212 so as to be interposed between the secured area 6253 and the corresponding anchored area 6213. As such, the secured area 6253 is biased to move away from the corresponding anchored area 6213.

As illustrated, referring again to FIG. 5, when the motor 50 (see FIG. 1) is operated for feeding a workpiece 4 of an irregular thickness along a feeding route in the direction (X), the hub member 621 is driven by the driven shaft 61 to rotate about the axis. The rotation of the hub member 621 is transmitted to the surrounding workpiece contacting member 622 via the coupling and biasing members 623 and the force transmitting members 625, thereby bringing the tangential points 6223 sequentially into contact with the workpiece 4. By virtue of the biasing action of the coupling and biasing members 623, the surrounding workpiece contacting member 622 can be moved upwardly so that the center 629 is located above the axis of the driven shaft 61 when the outer annular wall surface 6221 is in frictional contact with the workpiece 4. Thus, the deformation of the outer annular wall surface 6221 can be partly absorbed by the coupling and biasing members 623. Also, contact between the outer annular wall surface 6221 and the workpiece 4 of irregular thickness in the direction (X) can be maintained during the feeding operation.

Figure 6:
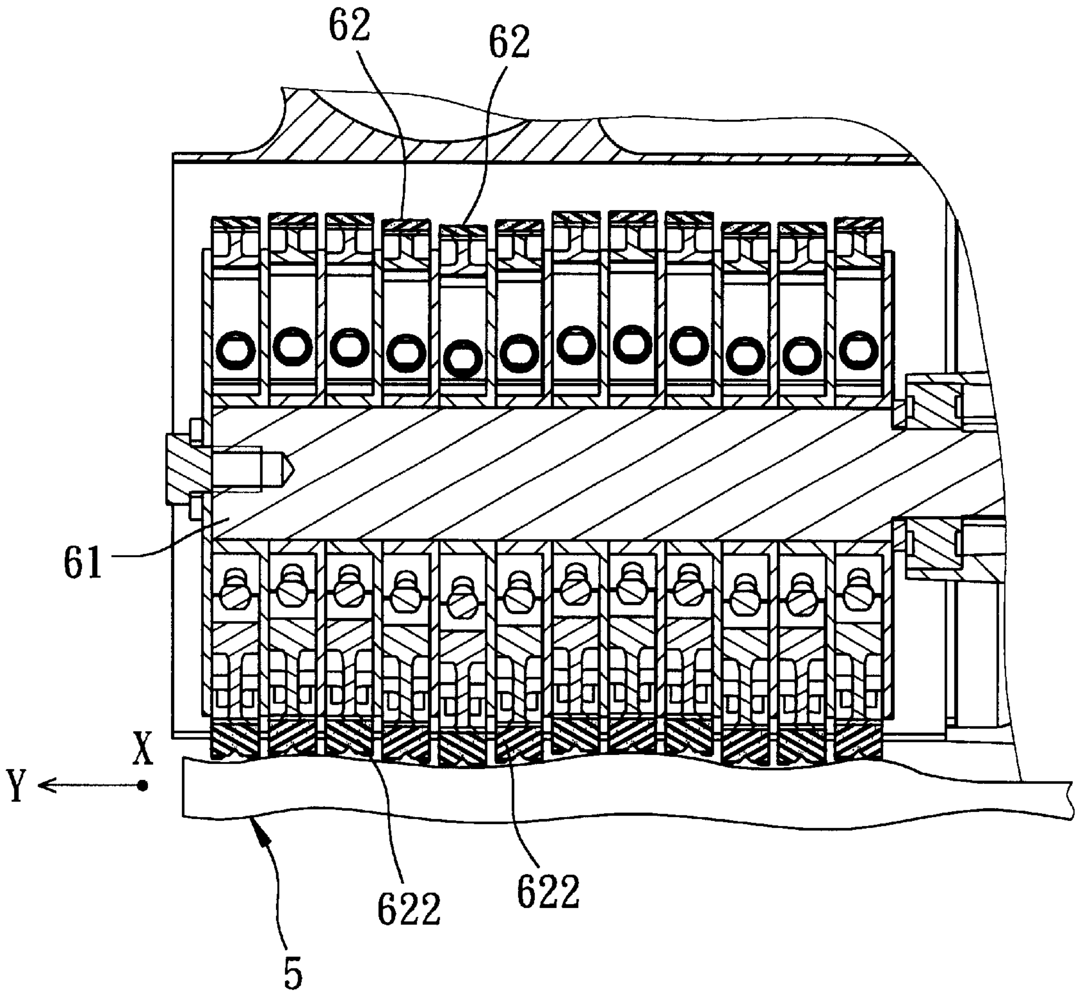
FIG. 6 is a schematic view showing the feeding device including the feeding rollers of the preferred embodiment when feeding another workpiece.

Referring to FIG. 6, when a workpiece 5 having irregular thickness along the direction (Y) is fed along the feeding route in the direction (X), each of the surrounding workpiece contacting members 622 of the feeding rollers 62 which are mounted on the driven shaft 61 can be moved upwardly to conform to the thickness of the workpiece 5, thereby preventing excessive pressure on the workpiece 5.

Alternatively, the feeding roller assembly 60 can include only one feeding roller 62 which is mounted on the driven shaft 61. In addition, the driven shaft 61 can be driven to rotate manually.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A feeding roller adapted to be mounted on a driven shaft for feeding a workpiece along a feeding route on a worktable, the driven shaft defining an axis, said feeding roller comprising:

a hub member adapted to be rotated with the driven shaft, and having a surrounding outer wall;

a plurality of anchored seat members disposed on said surrounding outer wall and angularly displaced from one another, each of said anchored seat members extending from said surrounding outer wall outwardly and terminating at a distal outer end so as to define an anchored area between said surrounding outer wall and said distal outer end;

a surrounding workpiece contacting member disposed to surround and to be spaced apart from said hub member, and including an outer annular wall surface having a plurality of tangential points which are angularly displaced from one another, each of said tangential points being adapted to be sequentially brought into frictional contact with the workpiece, said surrounding workpiece contacting member being configured such that when a respective one of said tangential points is brought into frictional contact with the workpiece, a reaction force is generated by the workpiece at said respective one of said tangential points and is directed towards the axis;

a plurality of force transmitting members extending from said outer annular wall surface inwardly and radially, and angularly displaced from one another such that each of said force transmitting members bears the reaction force emanating from said respective one of said tangential points, each of said force transmitting members including a secured area such that said secured area spacedly confronts and is ahead of a respective one of said anchored areas of said anchored seat members in one of clockwise and counterclockwise directions, and such that when said outer annular wall surface is forced by the reaction force inwardly at said respective one of said tangential points, said secured area is moved towards said respective one of said anchored areas; and a plurality of coupling and biasing members, each interposed between said secured area and said respective one of said anchored areas of said anchored seat members such that rotation of said hub member is transmitted to said surrounding workpiece contacting member, thereby bringing said tangential points sequentially into contact with the workpiece, and such that said secured area is biased to move away from said respective one of said anchored areas of said anchored seat members.

2. The feeding roller according to claim 1, wherein said surrounding workpiece contacting member further includes an inner annular wall surface opposite to said outer annular wall surface in radial directions, each of said force transmitting members further including a force transmitting segment which extends inwardly and radially from said inner annular wall surface and which terminates at a distal inner end, and a force diverting segment which extends from said distal inner end outwardly and which forms with said force transmitting segment an included acute angle that faces towards said surrounding workpiece contacting member so as to serve as said secured area.

3. The feeding roller according to claim 2, wherein each of said force transmitting members further includes an interconnecting segment which is disposed to connect said force diverting segment to said distal inner end of a next one of said force transmitting members, and which is spacedly interposed between said distal outer end of a respective one of said anchored seat members and said inner annular wall surface.

* * * * *